United States Patent [19]
Reinke et al.

[11] 3,976,520
[45] Aug. 24, 1976

[54] PIPE AND PROCESS FOR PRODUCING A WELDED AND QUENCH HARDENED STEEL

[75] Inventors: Friedhelm Reinke; Hermann Voss, both of Remscheid; Herbert Geisel, Remscheid-Luttringhausen, all of Germany

[73] Assignee: AEG Elotherm G.m.b.H., Remscheid, Germany

[22] Filed: Apr. 8, 1974

[21] Appl. No.: 459,208

[30] Foreign Application Priority Data
Apr. 21, 1973 Germany.............................. 2320428

[52] U.S. Cl.................................. 148/127; 148/34
[51] Int. Cl.².......................................... C21D 9/08
[58] Field of Search............................... 148/127, 34

[56] References Cited
UNITED STATES PATENTS
2,060,765  11/1936  Welch................................. 148/127
2,297,878  10/1942  Denneen et al...................... 148/127
3,728,782  4/1973  Ziemek................................ 148/127

*Primary Examiner*—R. Dean
*Attorney, Agent, or Firm*—Cushman, Darby & Cushman

[57] ABSTRACT

A method for producing a welded and quench hardened steel pipe and pipe whereby the weld seam running spirally or longitudinally along the pipe length has a lower austenization temperature than the pipe and/or a higher electrical resistance. The ratio of the pipe to seam resistance is preferably greater than one half and the whole of the square of the ratio between pipe wall thickness and mean seam thickness. The seam preferably includes amounts of C, Si, and Mn in the same percentage as the pipe plus nickel between 2–6%.

10 Claims, 1 Drawing Figure

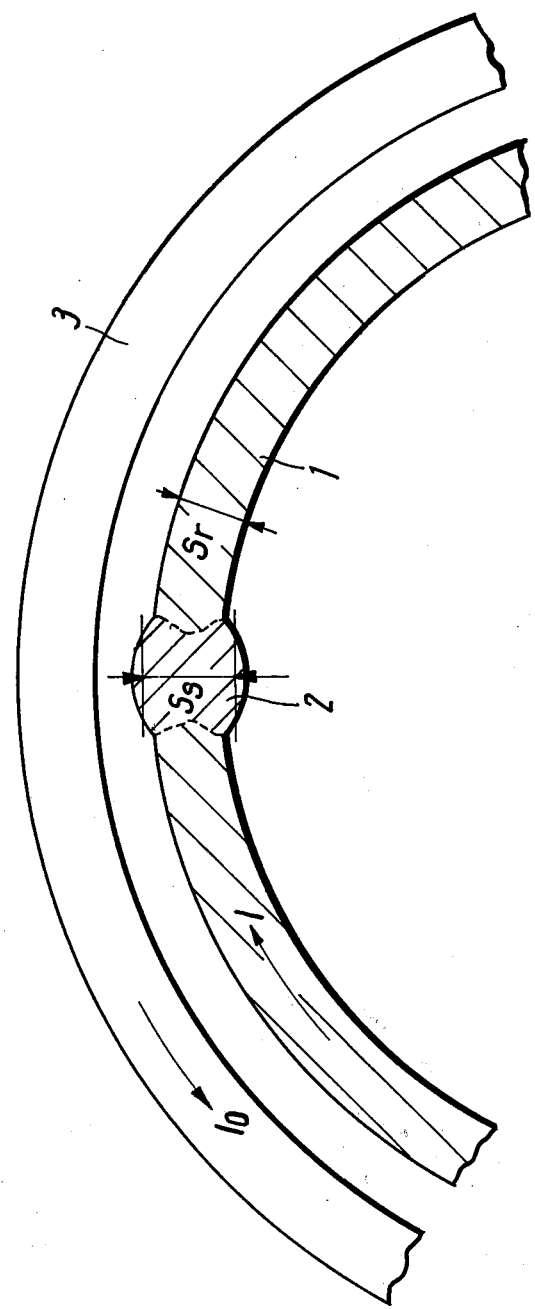

PIPE AND PROCESS FOR PRODUCING A WELDED AND QUENCH HARDENED STEEL

The invention relates to a process for inductively hardening welded steel pipes.

The penetration hardening of steel pipes for hardening can be accomplished advantageously by induction feed hardening. In this process, usually a coil-shaped inductor is provided, which encloses the pipe and which is moved in an axial direction in relation to the pipe, together with quenching showers arranged outside or inside the pipe. The currents induced by the inductor current within the pipe walls are closed essentially around the periphery of the pipe, so that, in the case of longitudinally or spirally welded pipes, current flows transversely through the welding seam.

One substantial problem however arises with the process.

Referring to the FIGURE, a section of the pipe wall 1 with the welding seam 2 is shown in cross section. Conductor 3 of the coil-shaped inductor enclosing the pipe 1 induces flow of current I, current I being induced per axial longitudinal unit of the pipe in the pipe wall 1. Current I flows in the same magnitude through the pipe wall with the thickness $S_r$, as well as transversely through the welding seam with the mean thickness $S_r$. Since this current in the welding seam 2 flows through a larger cross section than in the pipe wall 1, it is opposed here therefore, per unit of length of the circumference of the pipe, by a smaller ohmic resistance than in the pipe wall, so that, in the welding seam a smaller average output is converted for the purpose of heating than in the pipe wall.

This invention relates to a process for the production of welded and quench hardened steel pipes in which, especially for pipes with welded seams having mean dimensions of thickness which exceed considerably the thickness of the corresponding pipe walls in which at least almost equally good austenization will be achieved in the welded seam as in the pipe wall.

This task is solved by the process according to the invention in that a welding raw material is used which, in the temperature range below the hardening temperature of the raw material of the pipe, has a considerably higher specific electric resistance and/or a lower austenization temperature, than does the raw material of the pipe. At the same time, the following relationship preferably exists between the specific ohmic resistance $Q_r$ of the raw material of the pipe, the raw material resistance $Q_s$ for welding, the thickness of the pipe wall $S_r$ and the average thickness $S_s$ of the welding seam.

$$\frac{1}{2} \frac{(S_s)^2}{(S_r)} < \frac{s}{r} \leq \frac{(S_s)^2}{(S_r)}$$

Further, the process preferably is carried out with the raw material for welding having approximately the same amounts of C, Si and Mn as the raw material, as has the pipe. The weld preferably has a nickel amount between 2–6%.

The two preferred characteristics of the raw material for welding, namely the increase of the specific electric resistance and the lowering of the austenization temperature work in the same direction. As a result of the increased specific electric resistance of the raw material for welding, the degree of the temperature lag in the welding seam at least is decreased, while by lowering of the austenization temperature in the welding seam for the purpose of achieving an approximately equally good austenization as in the pipe wall, a certain lag of the temperature in the welding seam can be permitted during inductive heating.

At the same time we are starting out from a simplified model according to which, as can easily be shown, both on the assumption of small Kelvin (skin) effect as well as on the assumption of a marked skin effect, the lagging of the temperature in the welding seam in case of maintaining the designation $$\frac{\rho_s}{\rho_r} \simeq \frac{(S_s)^2}{(S_r)}$$

can be completely equalized.

In practice, for selection of a raw material for welding one will in most instances additionally make the requirement in case of a predetermined raw material for the pipe, that the welding material after quench hardening has practically the same raw material characteristics, especially practically the same yield strength and solidity as the raw material of the pipe.

In this case, nickel steels are desirable as raw material for welding. If one starts out indeed, for example, from a steel with 0.17% C, 0.25% Si and 0.8% Mn as the raw material for the pipe, then after welding and quench hardening with water quenching, one will achieve in the pipe wall a yield strength of 55 kg/mm² and a solidity of 85 kg/mm². A nickel steel suitable for this as a raw material for welding with 0.15% C, 0.25% Si, 0.5% Mn and 5% nickel (for example AISI 2 515) would in the case of quench hardening with water quenching likewise have about 55 kg/mm² yield strength and 85 kg/mm² solidity. On the other hand, in the case of this nickel steel and compared to the above-mentioned raw material for the pipe, the hardening temperature has been decreased to values 750°–780°C.

As is apparent from FIGS. 11 – 5, in the "Werkstoff-Handbuch Stahl und Eisen" (1965), an addition of nickel in the steel — at least in the range of up to about 30% nickel — causes an increase of the specific electric resistance. As a result of a few experiments with nickel steels of variably high nickel content, the optimum nickel content for the welding raw material for the above example can be determined to be between 2–6%.

Many changes and modifications of the above-described embodiment of the invention can be carried out without departing from the scope thereof. Accordingly, that scope is intended to be limited only by the scope of the appended claims.

What is claimed is:

1. A welded and quench hardened steel pipe made from steel with a weld seam comprised of nickel steel extending along its length wherein the weld seam has a considerably higher electrical resistance, at least below the hardening temperature, than the pipe.

2. A pipe as in claim 1 wherein the seam has a lower austenization temperature than the pipe.

3. A pipe as in claim 1 wherein the specific resistance $r$ of the pipe, the specific resistance of the seam $s$, the thickness of the pipe $S_r$ and the mean thickness $S_s$ of the seam are related by the formula:

$$\frac{1}{2} \frac{(S_s)^2}{(S_r)} < \frac{s}{r} \leq \frac{(S_s)^2}{(S_r)}$$

4. A pipe as in claim 1 wherein said pipe and weld seam include roughly the same percentage amounts of C, Si and Mn and said weld seam includes 2–6% Ni.

5. A welded and quench hardened steel pipe made from steel with a weld seam comprised of nickel steel extending along its length wherein the weld seam has a lower austenization temperature than the austenization temperature of the pipe.

6. A method of producing welded and hardened steel pipes comprising the steps of:
welding a seam along the length of a pipe with weld material comprised of nickel steel having an electrical resistance considerably higher than the electrical resistance of the pipe, at least below the hardening temperature,
inductively hardening said pipe and weld seam by moving along the length of said pipe a coil having at least a single coil extending about said pipe to induce current flow in said pipe and seam so as to inductively heat and harden said pipe and seam and applying a quenching medium to said heated pipe.

7. A method as in claim 6 wherein the seam has a lower austenization temperature than the pipe.

8. A method as in claim 7 wherein the specific resistance $r$ of the pipe, the specific resistance of the seam $s$, the thickness of the pipe $S_r$ and the mean thickness $S_s$ of the seam are related by the formula:

$$\frac{1}{2} \frac{(S_s)^2}{(S_r)} < \frac{s}{r} \leq \frac{(S_s)^2}{(S_r)}$$

9. A method as in claim 8 wherein said pipe and weld seam include roughly the same percentage amounts of C, Si and Mn and said weld seam includes 2–6% Ni.

10. A method of producing welded and hardened steel pipes comprising the steps of:
welding a seam along the length of a pipe with weld material comprised of nickel steel having a lower austenization temperature than the austenization temperature of the pipe,
inductively hardening said pipe and weld seam by moving along the length of said pipe a coil having at least a single coil extending about said pipe to induce current flow in said pipe and seam so as to inductively heat and harden said pipe and seam and applying a quenching medium to said heated pipe.

* * * * *